April 4, 1961

G. D. BECKER ET AL 2,977,809

VARIABLE ACTUATOR FOR SCREENS, FEEDERS AND THE LIKE

Filed Oct. 16, 1957

INVENTORS.
GEORGE D. BECKER,
KEITH B. LOWE
BY
Parker and Carter
ATTORNEYS.

INVENTORS.
GEORGE D. BECKER,
KEITH B. LOWE
BY Parker and Carter
ATTORNEYS.

United States Patent Office 2,977,809
Patented Apr. 4, 1961

2,977,809
VARIABLE ACTUATOR FOR SCREENS, FEEDERS AND THE LIKE

George D. Becker, Wauwatosa, and Keith B. Lowe, Milwaukee, Wis., assignors to Nordberg Manufacturing Company, Milwaukee, Wis., a corporation of Wisconsin Filed Oct. 16, 1957, Ser. No. 690,457

2 Claims. (Cl. 74—87)

Our invention relates to a self-contained variable actuator for screens, feeders and the like whereby a predetermined amplitude and direction of vibration may be imparted to a free body to produce a vibratory motion useful in classifying, sorting and many other processes in which a vibratory motion is desired. Essentially a pair of weights are mounted for rotation in opposite directions about a common axis by means of a pair of bevel gears interconnected by a pinon gear in such a manner that a throw or impulse of force will be produced twice in every complete rotation of the weights. By attaching the unit to a free body the intermittently coincident forces produced by the weights are imparted to the free body to cause it to vibrate in a predetermined manner. For the purpose of our description we consider a free body to be a body which, when not subject to any external force, will react to the influence of gravity only.

Devices for imparting a vibratory motion to screens, feeders, and similar mechanisms have been in use for many years and while some of them have given excellent service, many of them have proved impractical for reasons of complexity of design and operation, basic mechanical imperfections, or uncontrollable motion. There has been a great need for many years for a unit that is compact, simple, and inexpensive to manufacture with a minimum of moving parts that is easily assembled and operated. To build all of these qualities into one actuator and at the same time provide a degree of flexibility commensurate with the varying demands of industry has been the prime object of our invention.

Another object is the provision of a variable actuator which consists of a pair of weights operated from a suitable source of power rotatable about a common shaft whereby a predetermined amount of vibratory motion may be imparted to the free body to which it is attached.

Another object is the provision of a variable actuator wherein the component parts are easily interchangeable to provide a maximum degree of flexibility.

Another object is the provision of a variable actuator adapted for connection to a similar actuator in order to produce vibrations of varying amplitude in the same free body at the same time.

A further object is the provision of a variable actuator whereby the actuator either in operation by itself or in connection with a series of actuators may have the direction of vibration easily varied.

Yet another object is the provision of an actuator which may be connected in series with like actuators, the series being so adjustable as to give a uniform controlled motion to a free body in order to produce a gradual changing motion of a constantly varying amount, either of decreasing or increasing magnitude and direction.

Similarly, a further object is the provision of a variable actuator which is a compact self-contained unit requiring no discontinuous cross-connecting members to aid in the transfer of motive power from one portion of the unit to the other.

Another object is the provision of an actuator which is extremely safe in operation and in which no dirt is permitted to come in contact with the operating parts so that replacement and maintenance problems are substantially eliminated.

Another object is the provision of a series of variable connected actuators adapted for operation from a single source of power.

Another object is the provision of an actuator which is capable of quick replacement in changing from one size to another about the same shaft or in replacing worn or defective parts.

We also provide as a further object a variable actuator in which a pair of opposing weights are rotated in opposite directions through the medium of a self-contained gear train maintained in a closely spaced but prefectly synchronized relation in order to reduce the mechanical couple produced and maintain a nearly perfect dynamic balance, and reduce the bending moments in the common shaft to a minimum.

A further object is the provision of a completely closed oil reservoir encased within the actuator unit and capable of readily and expeditiously furnishing oil to all of the moving parts.

Other objects will become apparent during the course of the specification and claims.

We illustrate our invention more or less diagrammatically in the following figures wherein.

Figure 1:
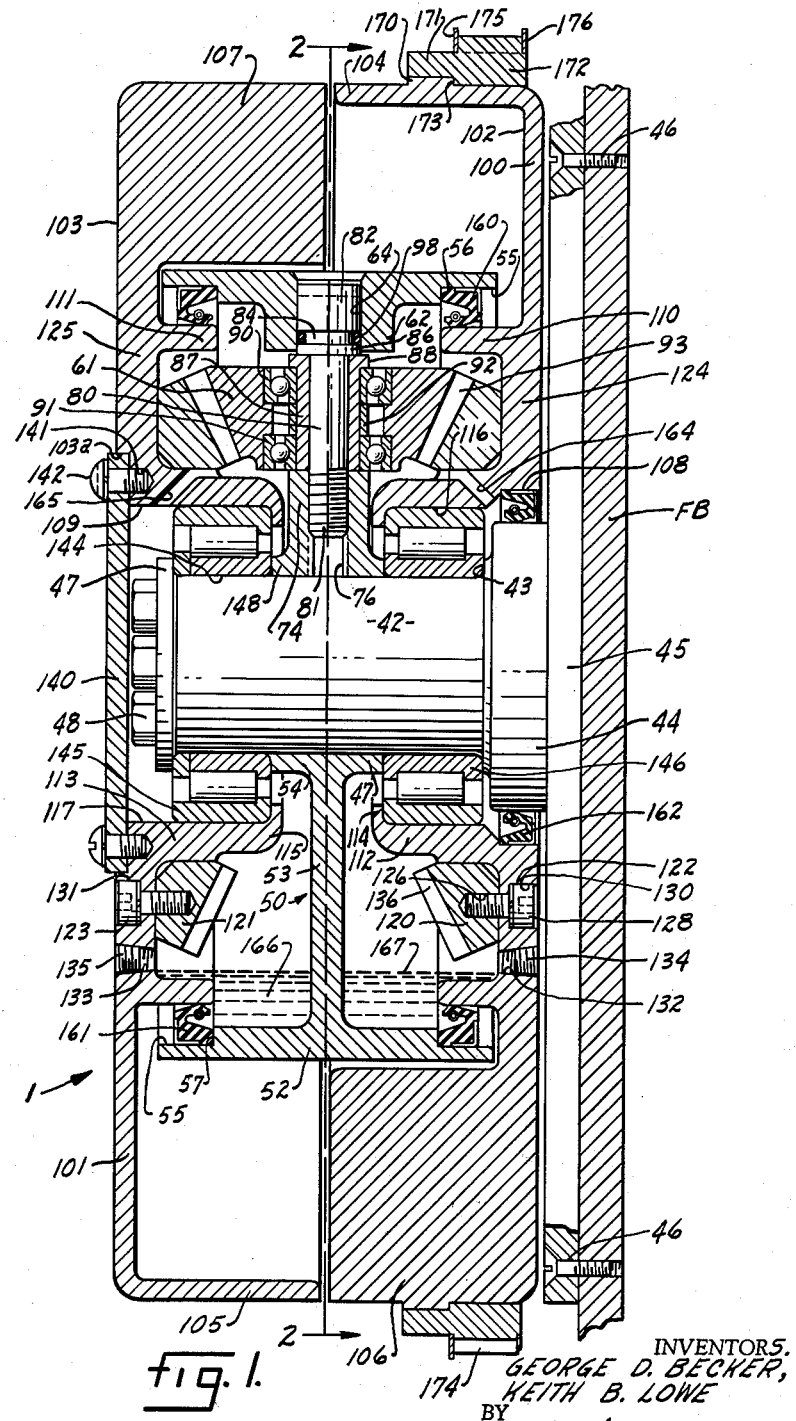
Figure 1 is a sectional view taken on the line 1—1 of Figure 2 and showing the interconnection of the bevel and pinion gears.

Referring more particularly now to Figure 1, 1 indicates generally our self-contained variable actuator. 42 is a fixed common stub shaft or gudgeon about which the weights rotate. The stub shaft 42 is integral with a gudgeon plate 45 which in turn is mounted to the side frame or any suitable portion of any free body FB through suitable securing and fastening means such as bolts 46. At the inner or righthand end of the common shaft as viewed in Figure 1, an annular shoulder 43 is formed for a purpose to be hereinafter described, and between the annular shoulder 43 and the gudgeon plate 45 is an annular base 44. At the outer or lefthand end of the fixed shaft is a bearing mounting plate or hub cap 47 rigidly connected to the stub shaft 42 through the provision of bolts 48 threaded into tapped holes in the shaft. Any suitable number may be employed but we find that four is sufficient for a secure connection, and at the same time requires a minimum amount of effort during replacement operations.

Rigidly connected to the stub shaft 42 is a pinion spider or central mounting disk indicated generally at 50. The spider is connected to the stub shaft by any suitable means such as a key 51 shown in Figure 2. It should be understood however that any suitable connecting means may be employed and we contemplate that set screws, for example, may be used. The spider consists essentially of an outer circular flange 52, an integral sleeve 54, and a connecting web 53 between the sleeve and flange. The sleeve 54 may be of any suitable dimension but must be large enough to accommodate the key 51 in order to provide a rigid connection to the stub shaft 42. The outer circumferential flange 52 is somewhat greater in thickness and its outer edges are notched at 55 in order to provide a pair of annular shoulders 56 and 57.

Outer circumferential flange 52 is shown as having a pair of projecting hubs 62 and 63 with a smooth bore 64 and 65 located respectively therein. The web 53 is cut away roughly in a butterfly design as shown most clearly in Figure 2 at 68 and 69. Each cutaway portion is in the form of a pair of wings indicated at 70 and 71 lying on each side of a trapezoidal area.

Near the sleeve 54 a pair of radially disposed sockets 73 and 74 are oppositely located with respect to projecting hubs 62 and 63. Suitable bores 76 and 77 are drilled and threaded in sockets 74 and 73 and disposed in alignment with the openings 64 and 65 in the projecting hubs 62 and 63. The openings 64 and 65 are considerably larger than the bores 76 and 77. A pinion shaft 80 is adapted to enter bores 64 and 76 and is provided with a suitable threaded portion 81. The pinion shaft 80 consists of an enlarged head 82 adapted to be slidably received in bore 64 and is slotted at 83 for engagement with a suitable operating tool. A shank portion 84 reduced in diameter from head 82 is formed at the base of head 82 and the remainder of pinion shaft 80 is of a diameter suitable for entry into bore 76 and similarly reduced in diameter from shank portion 84.

A pinion 61 is rotatably carried on the ball bearings 90 and 91 located rigidly axially on bushing 87, said bearings being located axially on bushing 87 by means of collar 88 and spacer 92. The bushing 87 is rigidly held to the hub 74 by means of the shoulder 86 on the shaft 80 through screw threads 81 disposed at the end of shaft 80 and suitably fitted to 76. The end of the shaft 80 has a head 82 rotatably fitted in the opening 64 in the projecting hub 62. This close fitting head is grooved at 84, for the acceptance and holding of a rubber O ring 98 disposed within this groove 84 so tightly as to seal the opening between 64 and 65 and the head 82. The pinion 61 is provided with suitable gear teeth 93 diagrammatically shown in engagement with bevel gear 120 through teeth 136.

An alternative form of construction that we have found satisfactory consists in the reversal of bushing 87 and enlargement of washer 86 so as to be disposed between pinion 61 and hub 62.

The internal bore 94 of pinion 61 is notched as at 95 and 96 to receive angular contact bearing 90 and single row ball bearing 91 respectively. The bore 94 is of a length equal to the spacer element 92 so that when assembled the ball bearings 90 and 91 will be maintained at exactly a 90° relationship with respect to the axis of pinion securing member 90.

Figure 2:
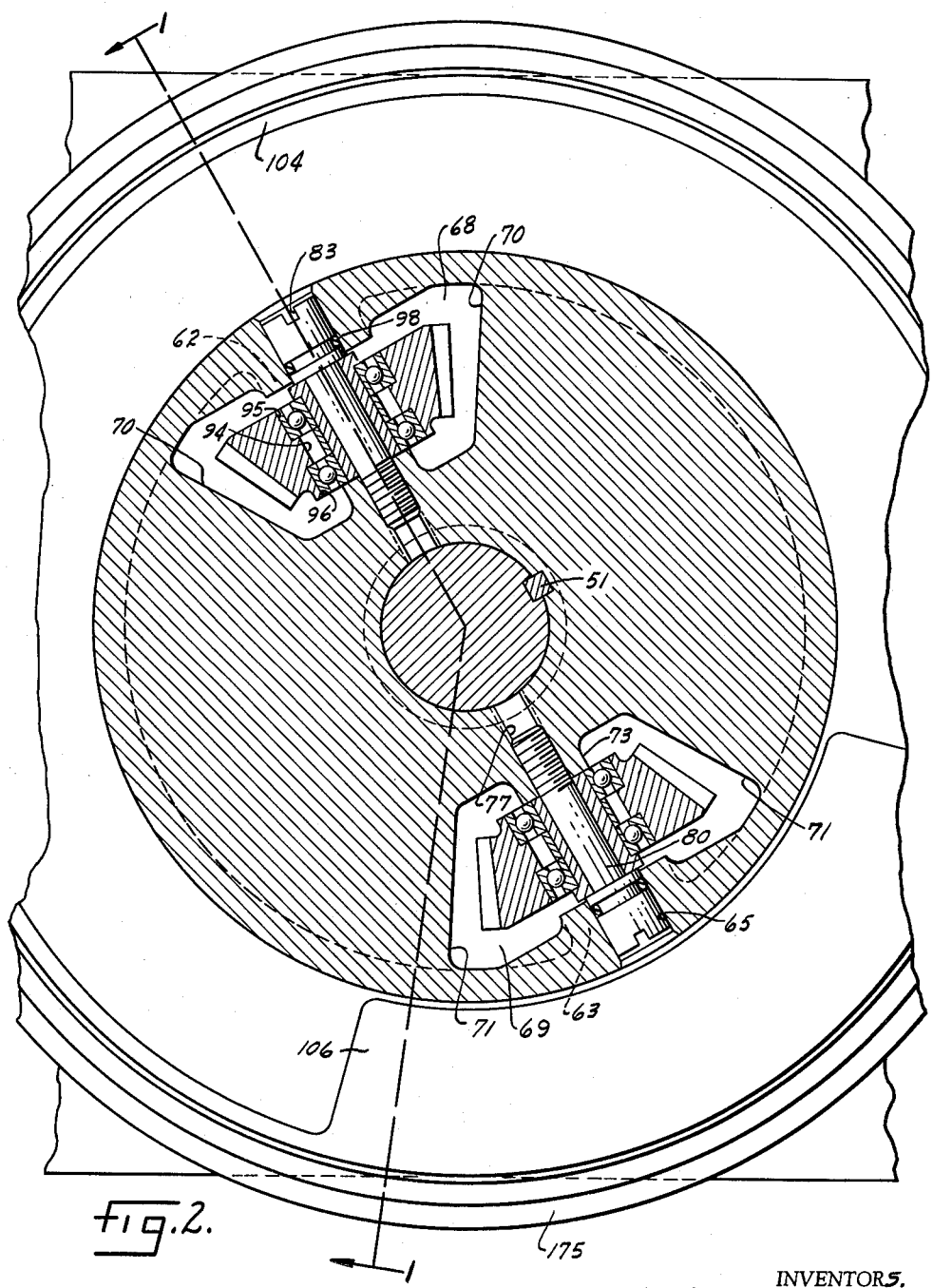
Figure 2 is a front view on the line 2—2 of Figure 1 and showing particularly the arrangement of the weights and the bevel gear connection.

Disposed revolvably with respect to the stub shaft 42 is a pair of flywheels 100 and 101. Flywheel 100 is composed of a face portion 102 and an external flange 104. External flange 104 is semi-continuous around a circumferential portion of flywheel 100 as is best seen in Figure 2. A portion of the flange is made integral with weight 106 which serves when rotated to produce the vibratory force. As shown in the figure, the weight 106 is integral with the flange 104 and the flywheel 100, but we consider it to be entirely within the scope of our invention to form the weight 106 as a separate element attachable through suitable connections to the interface 102 or flange 104. Thus, for example, by making the weight 106 a separate element and threading a series of holes in flange 104, it would be possible to dispose weight 106 at any desired position around the circumference of the member 100 by aligning the holes in the flange 104 with suitable holes on the backside of weight 106.

Flywheel 100 is formed with a circular bore 108 adapted to encircle annular base 44 of the stub shaft 42 with a suitable clearance therebetween. Between the bore 108 and inner surface of flange 104 an internal projection 110 extends in a circumferential manner. Projection 110 is located at a distance from the common center line less than the notched portion 55 of the web 53. A second somewhat longer projection is formed at 112 with an inturned outer end 114. The projection 112 is machined on its inside surface as at 116 to provide a race for suitable roller bearings. Located between projections 112 and 110 is a bevel gear 120 which is rigidly connected with flywheel 100 by connecting bolts 122 disposed within the thickened wall portion 124 of flywheel 100. The bolts 122 are threaded through the thickened wall portion 124 and into suitable receiving holes 126 in the bevel gear 120. The heads 128 of the bolts are disposed within recesses 130 a distance far enough so that there is no projection beyond the outer face of the flywheel 100. One or more washers may be used and we have found the conventional Allen head bolt to be entirely satisfactory. Drain passages 132 are formed in the thickened wall portion 124 with drain plugs 134 disposed therein for a purpose to be described hereinafter. Bevel gear 120 is formed with a series of engaging teeth 136 illustrated diagrammatically as meshing with the corresponding teeth 93 on the pinion 61.

Flywheel 101 is similar in construction to flywheel 100. Thus, a flange 105 forms the circumferential outer portion of flywheel 101 with a weight 107 similar to weight 106 disposed at one side thereof. An outer shaft assembly receiving bore is shown at 109. An internal circular projection 111 is formed between the flange 105 and an internal projection 113 which is similar to the projection 112. Projection 113 has its end turned in as at 115 and its internal surface is machined as at 117 to provide a race for suitable bearings to be described hereinafter. Surface 117 extends outwardly almost to the outer surface of face 103 of the weight member 101, the surface 103 having a notch 103a formed therein. A bevel gear 121 is positioned between projections 111 and 113 by means of suitable fastening members 123 set in recesses 131 in the thickened wall portion 125. Suitable washers may be employed and the bolts 123 may be similar to bolts 112. A drain passage 133 is located opposite drain passage 132 and has drain plug 135 therein.

A plate 140 is disposed on the outside surface face 103 and serves to form a seal completing the outer portion of the flywheel 101. Flywheel 101 has suitable threaded holes 141 in which bolts 142 extending through plate 140 are received. Any suitable number of bolts may be employed that will securely fasten plate 140 to flywheel 101 and yet facilitate easy replacement of parts.

Stub shaft 42 is accurately machined on its outer surface 144. Disposed around its outer surface 144 and located between the projections 113 and 112 of flywheels 101 and 100 is a series of roller bearings 145 and 146. Bearing 146 is held in snug engagement between righthand end 147 of inner circular flange 54 and the annular shoulder 43 on the fixed shaft 42 and the projection 112 with its inturned end 114. Bearing 145 is fixedly held in place by the lefthand end 148 of the sleeve 54, the bearing mounting plate or hub cap 47 and the projection 113 with its inturned portion 115.

Our variable actuator has a self-contained closed oil system including circumferential oil seals 160 and 161 disposed between the outer shoulders 56 and 57 of the outer circumferential flange 52 and the projections 110 and 111, of the flywheels 100 and 101. Annular circumferential bearing seal 162 is disposed between the annular base 44 and the passage 108 on the righthand flywheel 100. The circumferential O-ring seal 98 completes the closed oil system. Projecting portions 112 and 113 have oil connecting holes 164 and 165 disposed therein respectively. A quantity of oil shown at 166 may be maintained in the oil system and in the at rest position shown the static oil level is indicated at 167.

Flywheel 100 has a projection 170 circumferentially disposed approximately midway between its edges. A ring 171 having an offset portion 172 is adapted to slide over flywheel 100 and the notched portion 173 of ring 171 is adapted to engage projection 170 and to be securely fastened thereto by any suitable means, such as welding. An outer upstanding portion 174 is shown integral with main body portion 171. In the embodiment shown outer portion 174 may be duplicated as a series of teeth extending around ring 171 suitable for engagement with a chain drive from any suitable power source. Guide rings 175 and 176 are disposed at the outside edges of projections 174 in order to prevent lateral movement of a suitable drive chain capable of engagement with the projections or teeth 174.

Although a driving connection has been shown on one flywheel only, it is entirely feasible to form a similar connection on the companion flywheel in order to transmit power from the companion to another actuator assembly located some distance away on the same free body. Indeed, when the offset portion 172 is cast integrally with the flywheel, the economics of production will require that a driving connection be formed on the outer or companion flywheel whether other actuators are intended to be used or not.

Figure 3:
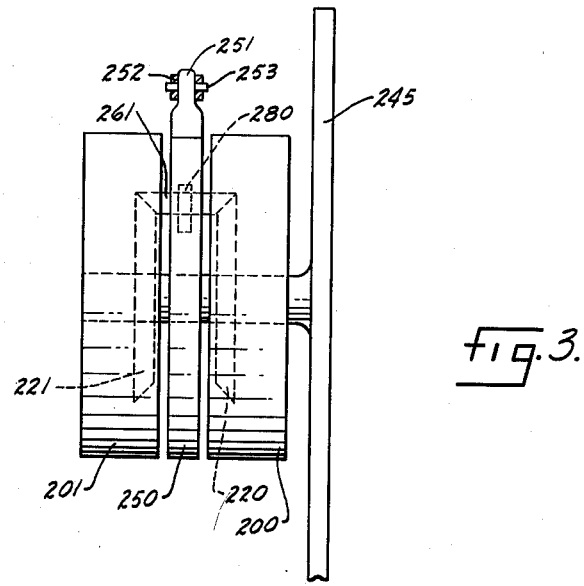
Figure 3 is a side view, diagrammatic in form, of another embodiment of our invention.
Figure 4:
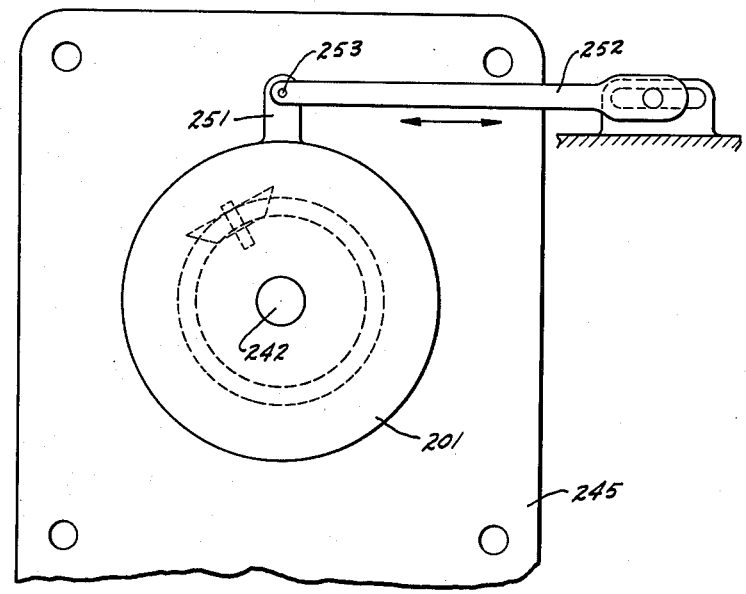
Figure 4 is a front view, also diagrammatic in form, of the Figure 3 embodiment.

Another embodiment of our invention is shown in Figures 3 and 4 in which parts corresponding to those shown in Figures 1 and 2 are indicated with a prefix of 200 wherever possible. These views are largely diagrammatic in form and it will be understood that the details of their internal construction are the same as those of the embodiment shown in Figures 1 and 2 except for the differences to be described.

In Figure 3 our variable actuator is shown as comprising a gudgeon plate 245 to which a stub shaft 242 is integrally connected. Gudgeon plate 245 may be connected to a free body by any suitable means. Flywheels 200 and 201 having bevel gears 220 and 221 respectively are mounted for rotation in opposite directions on the stub shaft 242 in the same manner as described above. In this embodiment, however, the flywheels do not closely abut each other. The flywheels are spaced to provide for a pinion spider 250, the spider having an extension 251 extending therefrom and projecting upwardly beyond the outer surfaces of the flanges of the flywheels. An adjuster link 252 is pivotally attached to the projection 251 at 253. A pinion shaft 280 carries a pinion 261 engageable with the bevel gears 220 and 221 in the same manner as the arrangement described in Figures 1 and 2. Spider 250 also carries pinion shaft 280 in the same manner as above described. The spider 250 is not keyed to the stub shaft 242, but is free to rotate with respect to it. Free rotation of the spider about the shaft is restrained by the adjuster link 252 which is pivotally attached to the spider and which may be set in any desired position by suitable holding or clamping means, thus varying the direction of force to the new position.

While we have shown and described a preferred embodiment and a variation of our invention, it will be understood that the illustration and description is of an illustrative nature only and many changes may be made in the size, shape and disposition of parts without departing from the scope of our invention.

The use and operation of our invention is as follows:

Referring now particularly to Figures 1 and 2, in general, once the weights are set so as to coincide at two points in the course of their revolution about the stub shaft 42 they will produce a vibration that varies in magnitude and direction directly to the size and disposition of the individual weights.

The direction of vibration will be determined by the setting of the bevel and pinion gears when the actuator is assembled. Thus to assemble the structure shown in Figure 1, flywheel 100 will be placed over the stub shaft 42 and then the spider 50 will be placed next to it with the teeth on the bevel gear 120 engaging the teeth on the pinion gear 61. The spider 50 is then fixed with respect to the stub shaft 42 by the means of key 51. Flywheel 101 is then placed over the stub shaft 42 with the teeth of its bevel gear 121 engaging the teeth of pinion gear 61. If, for example, it is desired to produce a maximum vibration in a vertical direction, the flywheels will be positioned so that the weights 107 and 106 will be assembled in a position 180° from each other in a horizontal direction, or coincident with each other in a vertical position. When power from a suitable source through a cog belt is delivered to the power connection 170, flywheel 100 will be rotated in one direction and flywheel 101 will be rotated in an opposite direction due to the pinion gear 61. Once the flywheels have been set the direction of vibration is fixed, and to change directions the power drive need only be disconnected and flywheel 101 loosened and rotated to a position which will give the desired direction of vibration.

The amplitude or magnitude of vibration will be determined by the size of the weights of the flywheels, for the vibration effect is produced by the coincidence of the unbalanced forces of the revolving weights. Since the force is a function of the weight of the flywheels and the radius arm, it is apparent that a wide range of amplitude and magnitude may be produced by interchangeability of the entire flywheels, or individual weights of each flywheel. In the embodiment shown, one weight is associated with each flywheel, and during one complete simultaneous revolution of each flywheel, the weights will twice coincide and twice lie in a 180° position with respect to one another. When they coincide, the force moments add, and when 180° to each other, the force moments balance out or offset one another. A direction of vibration is thereby produced lying along a line drawn between the points of coincidence of the weights.

With respect to Figures 3 and 4, the direction of vibration will be determined only approximately by the setting of the bevel gears 220 and 221 with respect to the pinion gear 261. In this embodiment in which the spider 250 is not rigidly connected to the stub shaft 242, the direction of vibration may be changed during the operation. That is, as the position of the pinion gear 261 changes with respect to the stub shaft 242 while the bevel gears 220 and 221 remain engaged with the pinion gear 261, the direction of vibration will be correspondingly varied. As the adjuster link 252 is moved back and forth as indicated by the doubleheaded arrow in Figure 4, the spider with its pinion gear 261 attached thereto will be correspondingly rotated about the stub shaft 242 and the direction of the vibration will be correspondingly positioned. It will be understood that adjuster link 252, while it may be put in constant motion during the operation of the actuator, will be usually preset to a given position and anchored with respect thereto during the course of the operation.

Our actuator assembly is characterized by an extremely long life in operation with corresponding savings in replacement parts and labor. An especially important feature of our actuator is the fact that the weights, especially in the embodiment shown in Figure 1, can be positioned very close to one another. Thus, the clearance between flywheels may be on the order of one-sixteenth of an inch or less. Due to this extremely small clearance, little or no bending moment is produced in the stub shaft 42 during rotation. The constant bending moment produced in a shaft tends to produce fatigue failure, which noticeably decreases the useful length of life of the machine and involves a great danger to workmen if failure should occur during operation.

Similarly our device is especially adapted for use in multiple operations. One or more actuators may be placed in series to operate an adjacent one. One of the series may in turn be run from a common source of power, and a variety of directions of vibration may thus be produced in a single free body. In a screen assembly, for example, a sorting or classifying action may be produced at the feed end of the screen by an actuator set for vertical vibrations and a conveying action may be produced at the discharge end of the screen by a vibrator set for horizontal motion. The reciprocation of the material to be treated is in a vertical direction thus producing a maximum separation and the horizontal motion at the discharge end of the screen gives a conveying effect which thereby passes the retained material off. Any number of actuators may be used at intermediate settings to promote the action.

The direction of vibration may be fixed before commencement of the day's operation by keying the spider to the shaft or by rigidly fixing the adjusting link if the spider is rotatable about the shaft. A rapid change in the direction of rotation may be produced either during or between successive operations when using the embodiment shown in Figures 3 and 4 by merely repositioning the adjusting link.

While many variations may be made in the form, shape and arrangement of the parts of our invention, we do not wish to be limited except by the scope of the following appended claims.

We claim:

1. A variable actuator unit adapted to impart a cyclic unbalanced impulse to a body to which it is attached including a fixed shaft having means at one end of the shaft for directly connecting the unit to a suitable body, a pair of weight carrying members, each member being of a circular disk-like shape with a weight in one portion of the member, said members mounted on the shaft in closely spaced, axially disposed relationship, a pair of bevel gears mounted on the weight carrying members in opposing relationship, a gear carrying spider mounted on the fixed shaft between the weight carrying members, said spider and disk-like weight carrying members forming an oil-tight chamber enclosing the gears, means to fix the spider with respect to the shaft, a third gear carried by the spider and engaging the bevel gears, and a power connection on one of the weight carrying members adapted to transmit power to the unit to produce rotational movement of the weight carrying members.

2. A variable actuator assembly for imparting a vibratory motion to a body to which it is attached including a stub shaft adapted to be connected to a screen, feeder, or the like, at least two weights separately mounted for rotation about the shaft and axially disposed along the shaft closely adjacent one another, first and second drive members each connected to a weight, a third member adapted to produce opposite relative rotation of the weights by transmission of movement from one drive member to the other, said drive members being positioned outwardly from the shaft a distance less than the innermost circular path of movement of the weights, means forming a closed oil chamber enclosing the drive transmitting members, said closed oil chamber being positioned within the inner circular path of movement of the weights, and a driving connection on the assembly for transmitting power to the assembly.

References Cited in the file of this patent

UNITED STATES PATENTS

| 1,827,586 | Keefer | Oct. 13, 1931 |
| 1,943,220 | Keefer | Jan. 9, 1934 |
| 2,065,798 | Dempsey et al. | Dec. 29, 1936 |
| 2,610,524 | Maust | Sept. 16, 1952 |

FOREIGN PATENTS

| 765,723 | France | Mar. 26, 1934 |